Nov. 25, 1941.  K. J. STRIGL  2,263,707
TRANSMISSION MECHANISM
Filed April 17, 1940   2 Sheets-Sheet 2
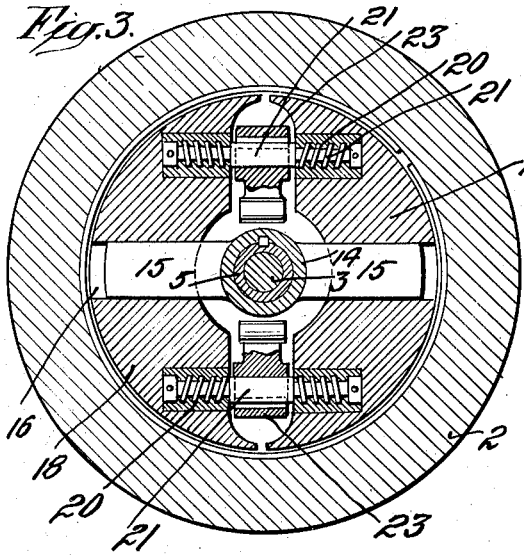
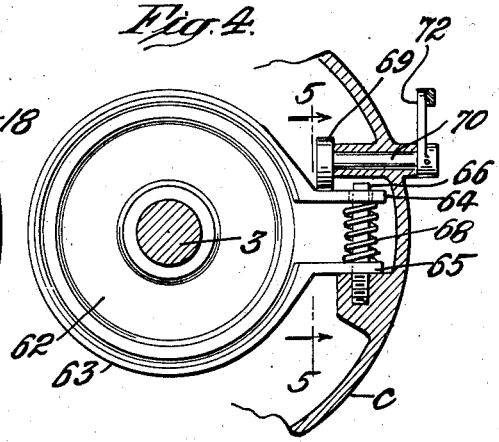
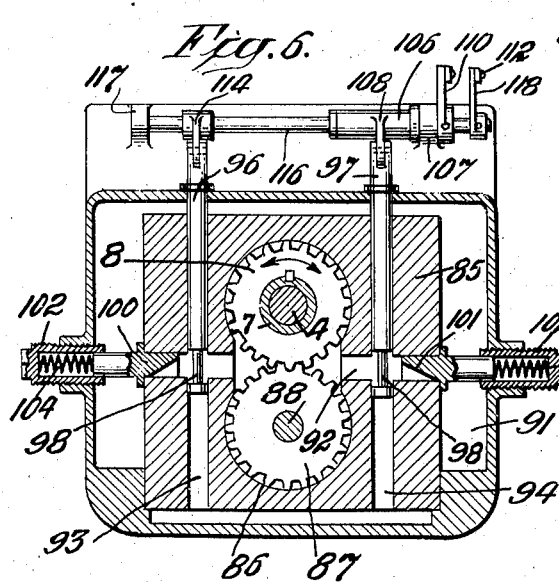
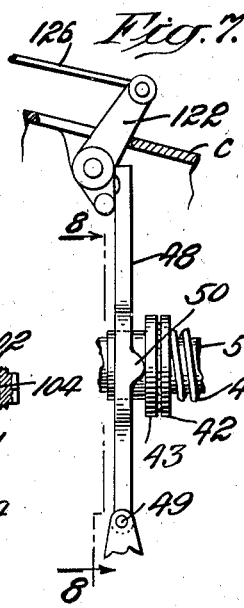
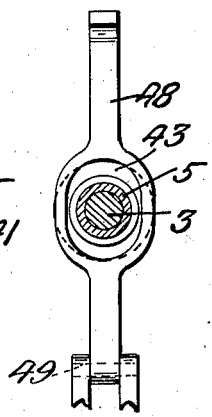
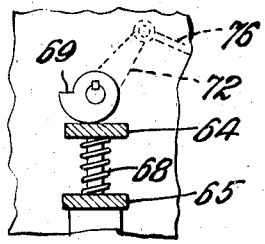
INVENTOR
KARL J. STRIGL
BY
ATTORNEY Patented Nov. 25, 1941

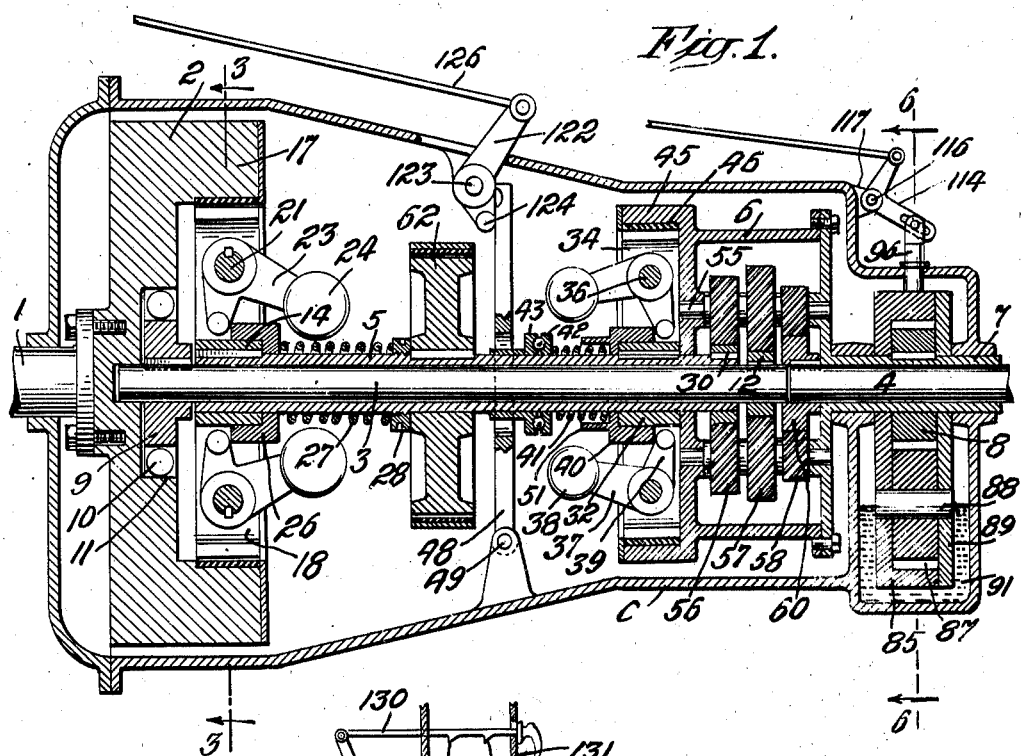

2,263,707

UNITED STATES PATENT OFFICE 2,263,707

TRANSMISSION MECHANISM

Karl Josef Strigl, Astoria, Long Island, N. Y.

Application April 17, 1940, Serial No. 330,028

17 Claims. (Cl. 74—260)

This invention relates to variable speed transmission mechanisms of the automatically operating type particularly adapted for motor vehicle operation and consists of an improved transmission design incorporating certain features of my prior Patent No. 1,892,021, issued December 27, 1932, in a simplified and perfected construction embodying further important features and advantages both structurally and in mode of operation.

Important objects accomplished by the present invention are to provide a variable speed transmission which will be fully automatic in its operation to assume a neutral, nondriving relation under idling speed condition of the motor; a low or first gear driving condition effected upon depression of the accelerator pedal; a second gear driving condition upon a given acceleration in speed and a direct or high gear drive condition responsive to a further and determined increase in the speed of the vehicle and with which is incorporated provision for effecting a reverse operation in a low gear ratio. It further includes a desirable manual adjusting control of the automatic shift from second to high gear adapted to vary the speed at which shift to high gear is effected or to prevent such shift at the election of the driver thereby better to meet unusual load conditions. The gearing mechanism in addition is designed to have a reactive drive of the motor from the driven shaft and wheels under momentum of the car during both second and high gear conditions thereby obtaining the braking effect of the motor compression. Associated therewith there is further provided a supplementary gearing retard of the driven shaft and vehicle operating in conjunction with the brake pedal and operative during the full speed range of operation and preferably in advance of the wheel brake action in the manner disclosed in my prior Patent No. 1,987,273 of January 8, 1935.

The aforesaid and other features and advantages of my present invention will be more fully understood by reference to the accompanying drawings wherein like reference characters of the description are applied to the corresponding parts in the several views.

In the drawings:

Fig. 1 is a central, vertical and longitudinal sectional view of the improved transmission of the present invention.

Fig. 2 is a view thereof in side elevation including portions of the operating or manual control connections.

Fig. 3 is a vertical cross-sectional view on line 3—3 of Fig. 1 showing the forward clutch segments and operating means therefor.

Fig. 4 is a detail sectional view showing the means for operating the reverse holding band.

Fig. 5 is a partial sectional view taken at right angles to Fig. 4.

Fig. 6 is a central, vertical cross-sectional view of the retarding device for the planetary gear casing taken on line 6—6 of Fig. 1.

Figs. 7 and 8 are respectively views in side elevation and in end elevation of the adjusting lever arrangement for varying the shift from second to high.

In the approved embodiment of the invention as shown, 1 indicates the power shaft which is the crank-shaft of an internal combustion motor of an automobile to be driven thereby and to which is connected as shown a fly wheel and drive member 2. Suitably journalled in axial alignment with the power shaft is a drive shaft 3 and a driven shaft 4; the latter in the usual manner being connected to drive the wheels of the vehicle through the differential gearing not shown.

Motion is transmitted to the driven shaft 4 from the drive member 2 through the drive shaft 3 or through a drive sleeve 5 surrounding and rotatable on the drive shaft and through planetary type variable speed gearing journalled in a rotatably mounted gear casing 6. The casing 6 has an integral sleeve extension 7 to which is keyed a control gear 8 of a fluid gear retarding means for the planetary gear casing.

To transmit motion from the drive member 2 through the drive shaft 3, the latter is journalled in the drive member and has keyed thereto a radial cam disc 9 of an overrunning clutch of conventional type having clutch balls 10 radially acting on an annular wall 11 formed in the drive member; the cams providing for clutching engagement upon the clock-wise rotation of the drive member relative to the drive shaft and thereby allowing of clock-wise advance rotation of the driving shaft at a speed increased relative to the speed of the drive member. The rearward end of the driving shaft has affixed thereon a first or low speed drive gear 12 of the planet gearing mechanism.

To transmit the motion from the drive member 2 through the drive sleeve 5, the sleeve has secured thereto an expanding clutch device, automatically operable under centrifugal action to couple the sleeve and drive member to rotate in unison. This clutch device (Figs. 1 and 3) consists of an integral hub and key member 14 keyed on the sleeve 5 and having opposite, radial key and guide arms 15 fitting guideways 16 of oppositely positioned clutch segments 18 arranged to be enclosed by an annular wall flange 17 of the drive member 2. Interposed between the circumferential surface of the segments and the flange 17 is a composition split friction band. To effect the coupling engagement under centrifugal action, the segments have fixed within aligned recesses thereof, internally and oppositely threaded screws 20 engaged by complemental threads of oppositely threaded spindles 21 to which are secured bell crank levers 23 having governor weights 24. The inwardly directed, shorter arms of the bell crank levers 23 engage a slidable collar 26 acted upon by a compression coil spring 27 engaged at its opposite end by an adjusting nut 28 threaded on the sleeve. The rearward extremity of the sleeve has keyed thereon a second gear drive gear operating through the planet gearing for second gear drive.

A similar centrifugally actuated clutch device is provided and arranged to effect coupling of the sleeve to the planetary gear casing 6 for rotation in unison and resulting direct drive condition. This includes the hub and key member 32, similar to the member 14 with its arms 15. The hub member 32 has keyed drive engagement with opposite, radially movable segments 34 expanded by oppositely threaded spindles 36 having fixed thereon the weighted bell crank levers 37 provided with weights 38 and having their inwardly extended arms 39 engaging slidable sleeve 40 under spring pressure of coil spring 41 engaging roller bearing collar 42 bearing against an adjustable stop collar 43 with bearing balls interposed. The segments as shown are positioned to effect coupling engagement with an annular, encircling flange 45 integrally formed on the casing 6, the engagement being through the interposition of a composite split friction band 46 in the conventional manner. As shown in Figs. 1, 7 and 8, the adjustable stop collar 43 is slidable on the sleeve 5 and bears against a pivoted pressure adjusting arm 48, pivoted at 49 on the transmission casing c and provided with opposite engaging lugs 50 on a central yoke portion straddling the sleeve for balanced engagement with the collar 43. Shifting of the arm 48 will adjust the tension of the spring 41 and in consequence determine the speed at which the coupling for direct drive is effected. The sleeve 40 is provided with an extension flange 51 enclosing the spring and forming a stop which when engaged by collar 42 will prevent the centrifugal acting coupling movement of the levers 37.

The planetary gearing mechanism includes the usual oppositely positioned counter-shafts 55 carried in the casing 6 and having journalled thereon integrated planet gears 56, 57 and 58 of different pitch diameter. Of these gears; 56 is in mesh with drive sleeve gear 30 for second gear drive; 57 is in mesh with drive shaft gear 12 for low or first gear drive and gears 58 are in mesh with a driven gear 60 keyed on the driven shaft 4 for the transmission of the driving motion thereto in accordance with the conditions for drive as established.

To effect a reverse drive condition, as hereinafter described, the sleeve 5 has keyed thereon a brake or holding drum member 62 engaged by an external brake band 63 having end lugs or ears 64—65 (Figs. 4 and 5). The lugs 65 is anchored to a fixed portion of the casing by a guide stud 66 fitted to an enlarged aperture in the upper lug 64 and a compression spring 68 surrounds the stud between the lugs normally to expand the lug ends of the band. To effect holding of the sleeve, a cam 69 is fixed on spindle or shaft 70, journalled in a bearing in the casing, in position to engage the lug 64 whereby on rotation of the cam 69 it will compress the band against the influence of the spring 68. The outer end of the spindle has affixed thereon an arm 72 for articulated connection to an operating member, as here shown in Fig. 2, a reverse pedal lever 73 pivoted on shaft 74 with depending arm 75 connected to the arm 72 by compressible or resilient telescoping connection 76—77, the member 76 having a sleeve containing spring 78 compressible by the enlarged end of the member 77 to permit continued advance of the reverse pedal 73 after locking of the drum 62, this motion being employed for acceleration of the motor; the pedal lever 73 having an arm 80 to which is pivoted connecting rod 81 to the carburetor or gas throttle control.

While any suitable holding or retarding means for the planetary gearing casing may be employed for controlling the gearing relation, I desirably employ the fluid or oil gear pump type of retarding device as shown in Figs. 1 and 6 which is particularly suited to have a cushioning effect in the changing of gearing relation thereby avoiding abrupt increase in speed and further adapted, under certain conditions, to have a braking or retarding effect on the vehicle.

This retarding device consists of a fixed casing or block 85 having a central recess 86 formed to closely enclose or confine the co-acting pump gears including the casing 6 retard gear 8 keyed to sleeve 7 and a co-acting gear 87 journalled on spindle 88 supported by the block 85 and face plate 89 secured thereto. As best shown in Fig. 1, the retard device is positioned within an oil reservoir 91 formed by the rear end wall structure of the transmission casing c and the block 85 is formed with a central, horizontal oil passage 92 communicating with the gear recess 86 and with opposite, vertical passages 93—94 open to the oil reservoir 91. Within the upward ends of the bores providing the passages 93—94 are closely fitting valve rods or plungers 96—97 having reduced portions 98 adjacent to their lower ends which enter the lower portions of the bores or oil passages when the valve rods are depressed for closing of the passages 93 or 94.

The opposite ends of the central horizontal bore 92 are closed by yieldingly secured plugs 100 having inclined slots 101 at their inwardly facing end portions and having their outer bearing portions supported in adjustable bearing sockets 102 threaded to casing c and with springs 104 interposed between the plug and bearing socket end wall as shown.

The controlling and operating connections for the valve plungers 96 and 97 comprise a bearing sleeve 106 journalled in a bracket 107 of casing c and having slotted arm 108 pivotally connected to the valve rod 97 and having fixed thereon arm 110 to which is pivoted connecting rod 112 connected to the usual brake operating pedal lever 113 having operating connection to the wheel brakes not shown. The valve 96 is operated by a slotted arm 114 pivotally connected thereto, the arm being fixed on shaft 116 journalled in bracket 117 and the sleeve 106 and having on its extended end portion an arm 118 to which is pivotally connected an operating rod 120 extended forwardly and connected to be operated by the throttle connections under control of the usual accelerator pedal 121 for controlling the speed of the motor whereby depression of the accelerator will effect raising or opening of the valve 96. In operation of the gear pump retard, with both valves 96—97 in normal closed position, the gears will be free to idle in vacuum while raising of one or the other of the valves will effect locking of the gears by the intake of oil at the raised valve side and choking of the discharge by the oppositely positioned closed valve.

To effect shifting of the lever 48 and adjusting of the tension of the spring 41 affecting the action of the direct drive clutch levers 37, manually operated connections are provided. As best shown in Figs. 1 and 2, these connections include a pivoted bell crank lever 122 pivoted at 123 and having a depending arm 124 engaging the lever 48 as shown. This lever 122 is connected by rod 126 to lever 127 fulcrumed at 128 on bracket 129 and pivotally connected at its upper end to manual shift rod 130 passed through an enlarged aperture in the dash panel 131 and having detents 133—134 on the underside thereof for retaining adjusted positions.

OPERATION

As in its normal operation, depression of the accelerator pedal will open retard valve 96 with resulting forward drive in low gear, the initial starting of the motor may desirably be effected by the usual hand throttle connections (not shown) although, as an alternative, the foot accelerator pedal may be used without drive by simultaneously depressing the brake pedal which opens the then discharge side of the gear retard by raising valve 97 thus allowing rotation of the planet casing 6 and non-drive in neutral drive condition at accelerated speed of the motor. Assuming hand gas starting, the valves 96 and 97 of the retard device are in closed position as shown in Fig. 6 allowing free rotation of the retard control gears 8 and 87 with the result that the motion is transmitted from the drive member 2 counter-clockwise (as viewed from the right of Fig. 1) through clutch 10, drive shaft 3, gears 12, 57 to effect free rotation of the planet casing 6 clockwise without imparting motion to driven shaft 4. The condition is accordingly that of neutral drive during which the gearing 56—30 will effect a free or non-drive rotation of the driving sleeve 5 in counter-clockwise rotation. The gearing ratio is such that for each three revolutions of the drive member counter-clockwise, the casing 6 will make one revolution clockwise. The driving sleeve 5 will rotate counter-clockwise at the rate of .6 revolution to each 3 revolutions of the driving shaft 3 or at the ratio of 5 to 1. Therefore all parts keyed to the drive sleeve 5 will make one revolution to each five revolutions of the motor crank-shaft. The governor weights of both automatic clutches remain in non-coupling position as shown in Fig. 1 and the retarding device pump gears will idle as both valves 96 and 97 are in closed position.

Low or first gear drive

Upon depression of the accelerator pedal the motor is speeded up and at the same time the valve rod 96 is raised and opens the then intake side 93 of passage 92, 93, 94 of the oil cycle. The resulting suddenly applied oil pressure at the opposite or discharge side of the gears will cause the associated yieldable plug 100 to yield momentarily to allow oil discharge and consequently cushion the action of starting in gear. The plug will then close under normal load stress and the closed discharge will fully stop the retard gears 8—87 and hold the planet casing 6 from rotation. The driving motion is then transmitted from drive shaft 3 through the planetary gearing to gear 60 on the driven shaft 4 for low gear drive with a drive ratio of three to one. At this time the driving sleeve 5 will be rotated to make 1.6 revolutions counter-clockwise to each three revolutions of the driving shaft 3.

Second gear drive

With the centrifugally acting clutch mechanism including weights 24 and segments 18 set to expand at say ten miles per hour speed of the car, upon attaining that speed the clutch will effect coupling of the driving member 2 with the drive sleeve 5 to then drive the driven shaft by means of the drive sleeve gear 30 transmitting motion through the planetary gearing to the driven gear 60 on shaft 4. The drive is now in a ratio of 1.6 of the driving member to 1 of the driven shaft which is intermediate or second gear drive; the retard or gear pump gears and casing 6 being still held against rotation as described. Under this second gear drive condition, the driving shaft 3 will be rotated in advance of the driving member as permitted by the overrunning clutch 9—11. At speed increase the drive will remain in second until a determined increase actuates the centrifugal clutch including the levers 37 and segments 34 when direct drive condition will occur.

Direct or high gear

Under centrifugal action, the segments 34 will be expanded into coupling engagement with the casing flange 45 thereby coupling the drive sleeve 5 directly to the planet casing 6 to rotate in unison for high gear, direct drive operation. As will be understood, at this time both centrifugally acting clutches will effect coupling engagement and the drive member, drive sleeve 5, casing 6 and drive shaft 3 and the driven shaft 4 will all rotate in unison; the pump gear 8 will likewise rotate counter-clockwise and there will be no oil passing through the gear pump so that its gears will idle.

Lockout of high gear and adjustment of automatic change into high gear

As described, provision is made for adjusting the bearing collar 43 for varying the operating tension of the centrifugal action control spring 41 thereby to vary the speed point at which automatic shifting from second gear to high gear occurs or for fully preventing the centrifugal coupling so as to remain in second gear relation at all speeds. As shown, the adjusting connections are operated by manually shiftable member 130 having the detents or locking shoulders 133 and 134. With the control arm 130 pulled out for stop engagement by detent 133 the spring will be fully compressed with the bearing 42 engaging stop flange 51 thereby preventing outward movement of the levers 37 and accordingly locking out the automatic shift into high gear. This permits of remaining in second gear drive as long as may be desired by the operator. Shifting of the control arm 130 to intermediate position with engagement of the detent 134 adjusts the automatic speed of change to about 35 miles per hour which may be desirable in hilly driving whereas in the normal position as shown the automatic shift will be effected at a desired lower speed of say twenty miles per hour.

Deceleration and stopping of car

Upon releasing of the accelerator or gas pedal the car will slow down as the motor will then retard the momentum of the car by its braking effect. The motor will always be connected with the driven shaft 4 as long as the automatic clutch 18 is engaged with the driving member. The driving connections only disengage from the motor when the speed drops to about six miles per hour for idling and low gear driving. Upon stopping by use of the brakes the transmission will automatically assume neutral driving condition and allow free idling of the motor.

Supplemental retard

In downgrade operation, upon releasing of the accelerator pedal the valve 96 returns to closed position. If plunger valve 97 is now raised by depression of the brake pedal the channel 94 by suction of the gears becomes the oil intake and the discharge is through the relief block at the opposite side of the gears 8—87 since gear 8 now tends to rotate counter-clockwise. The narrow space afforded by the reduced sections of the valve 98 serves to let the oil pass by toward the plug 100 and to balance the pressure on the plunger. This produces a supplemental braking action on the wheels of the car and desirably may be adjusted in its action to be effective prior to and during the action of the usual wheel brakes.

From neutral to reverse drive

For reverse drive the drum 62 on driving sleeve 5 is held against rotation. This is effected by the reverse pedal lever 73 through the operating connections as described. When drum 62 is held against rotation, driving sleeve 5 and all parts on said sleeve including drive gear 30 do not rotate. The driving shaft 3 and drive gear 12 rotate with the motor counter-clockwise and planet gear 56 rotates around stationary sleeve drive gear 30 in clockwise direction. Gear casing 6 also rotates in clockwise direction at 1.6 revolutions to each three revolutions of the drive member 2. The driven gear 60 on the driven shaft 4 is forced to rotate also clockwise at a rate of .6 revolution each three revolutions of the drive member 2. The drive is now in reverse at a ratio of 5 to 1. As will be understood, the compressible connection 76—78 allows of further acceleration of the motor to increase speed of the reverse drive.

The described transmission is of relatively simple and sturdy construction, is adapted to be fully automatic in operation from normal neutral, through low and second gear to direct drive responsive to the speed of operation; is adapted to permit manual adjustment for varying the range of second gear or intermediate gear ratio operation to meet specific driving conditions including provision to fully shut out automatic shift to direct drive thereby allowing second gear drive at all speeds when desired. The improved gearing arrangement further, by reason of the coupling of the drive member to the drive sleeve, provides for the desirable reactive braking effect by the motor through the driving connections from the wheels under momentum of the car on down grades both in high and second gear operating condition. The manual adjustment of the second gear drive, moreover, may be effected under driving conditions without transmission of shock by reason of the cushioning action of the relief plugs or valves 100 of the fluid retard device which insures a non-abrupt and more progressive speed change.

Having described my invention, I claim:

1. A transmission of the character described comprising a drive member, a driving shaft, a driving sleeve surrounding the driving shaft, driving gears carried by the driving shaft and the driving sleeve, planet gearing engaged by the drive gears and journalled in a rotatable casing, a driven shaft having a driven gear meshing with the planet gearing to be driven thereby, control means for retarding the casing for planet gearing drive, an overrunning clutch connection between the driving member and the driving shaft and adapted to permit advance rotation of the shaft relative to the member, a centrifugally acting clutch operative to couple the driving member and the driving sleeve and a second centrifugally acting clutch operative to couple the driving sleeve and the casing to rotate in unison for direct drive.

2. A transmission of the character described comprising a drive member, a driving shaft, a driving sleeve surrounding the driving shaft, driving gears carried by the driving shaft and the driving sleeve, planet gearing engaged by the drive gears and journalled in a rotatable casing, a driven shaft having a driven gear meshing with the planet gearing to be driven thereby, control means for retarding the casing for planet gear drive, an overrunning clutch connection between the driving member and the driving shaft and adapted to permit advance rotation of the latter, a centrifugally acting clutch rotatably carried by the driving sleeve and operative for coupling engagement with the drive member, a second centrifugally acting clutch rotatably connected to the driving sleeve to be operative for coupling engagement with the casing at higher speed of rotation of the sleeve to effect direct drive.

3. A transmission of the character described comprising a drive member, a driving shaft, a driving sleeve surrounding the driving shaft, driving gears carried by the driving shaft and the driving sleeve, planet gearing engaged by the drive gears and journalled in a rotatable casing, a driven shaft having a driven gear meshing with the planet gearing to be driven thereby, control means for retarding the casing for planet gearing drive, an overrunning clutch connection between the driving member and the driving shaft and adapted to permit advance rotation of the shaft relative to the member, a centrifugally acting clutch operative to couple the driving member and the driving sleeve for intermediate gearing drive, a second centrifugally acting clutch operative upon higher sleeve rotative speed to couple the driving sleeve and the casing to rotate in unison for direct drive and manually operable means for varying the centrifugal action of said second clutch to vary the automatic coupling speed thereof.

4. A transmission of the character described comprising a drive member, a driving shaft, a driving sleeve surrounding the driving shaft, driving gears carried by the driving shaft and the driving sleeve, planet gearing engaged by the drive gears and journalled in a rotatable casing, a driven shaft having a driven gear meshing with the planet gearing to be driven thereby, control means for retarding the casing for planet gearing drive, an overrunning clutch connection between the driving member and the driving shaft permitting advance rotation of the latter, a centrifugally acting clutch operative to couple the driving sleeve to the driving member, a second centrifugally acting clutch operative to couple the sleeve to the casing for direct drive and manually operable adjusting means for said second clutch adapted to prevent the coupling engagement thereof for remaining in intermediate drive at increased speeds of operation.

5. A transmission of the character described comprising a motor and drive member driven thereby, a driving shaft, an overrunning clutch interposed between the drive member and the driving shaft to permit advance rotation of the latter, a driving sleeve surrounding the driving shaft, drive gears fixed on the driving shaft and driving sleeve, planet gears engaged by the drive gears and journalled in a rotatable casing, a driven shaft having a driven gear engaged by the planet gearing to be driven thereby, manually operable control means for retarding the casing for planet gearing drive operatively connected to the accelerator of the motor to be operable therewith, a centrifugally acting clutch arranged to couple the driving member and the driving sleeve for intermediate gear drive through the latter and a second centrifugally acting clutch arranged to couple the driving sleeve and the casing for direct drive and manually operable holding means operative to prevent rotation of the drive sleeve to effect a reverse drive relation through the planetary gearing.

6. A transmission as claimed in claim 5 wherein the holding means for effecting reverse drive is actuated by a manually operable lever having operating connections to the holding means and to the accelerator of the motor, substantially as described.

7. A transmission as claimed in claim 5 wherein the holding means for effecting reverse drive is actuated by a manually operable lever having articulated connections to the holding means for the operation thereof including a yielding connection and having operating connection to the accelerator of the motor thereby to permit further acceleration of the motor after holding of the sleeve is effected.

8. In combination with a motor and manually operable accelerator connections thereto, a transmission mechanism comprising a drive shaft, a driving sleeve surrounding said shaft, drive gears carried by the driving shaft and the driving sleeve, planet gearing engaged by the drive gears and journalled in a rotatable casing, a driven shaft having a driven gear meshing with the planet gearing to be driven thereby, control means for retarding the casing for planetary gearing drive, an overrunning clutch connection between the driving member and the driving shaft and adapted to permit advance rotation of the latter with relation to the member, a centrifugally acting clutch operative to couple the driving member and the driving sleeve, a second centrifugally acting clutch operative to couple the driving sleeve and the casing for direct drive and operating connections for the retard control means connected with the accelerator connections to be operable therewith.

9. In combination with a motor and manually operable accelerator connections thereto, a transmission mechanism comprising a drive shaft, a driving sleeve surrounding said shaft, drive gears carried by the driving shaft and the driving sleeve, planet gearing engaged by the drive gears and journalled in a rotatable casing, a driven shaft having a driven gear meshing with the planet gearing, control means for retarding the casing for planetary gearing drive, an overrunning clutch connection between the driving member and the driving shaft to permit relative advance rotation of the latter, a centrifugally acting clutch arranged to couple the driving member and the driving sleeve, a second centrifugally acting clutch arranged to couple the driving sleeve and the casing for direct drive, holding means operative to prevent rotation of the sleeve to effect a reverse drive condition, actuating connections for the holding means and manually operable actuating connections for the control means connected to be operable with the accelerator connections.

10. In combination with a motor and manually operable accelerator connections thereto, a transmission mechanism comprising a drive member, a driving shaft, a driving sleeve surrounding the driving shaft, driving gears carried by the driving shaft and the driving sleeve, planet gearing engaged by the drive gears and journalled in a rotatable casing, a driven shaft having a driven gear meshing with the planet gearing, fluid actuated control means for retarding the casing for planet gearing drive, an overrunning clutch connection between the driving member and the driving shaft and adapted to permit relative advance rotation of the latter, a centrifugally acting clutch operative to couple the driving member and the driving sleeve and a second centrifugally acting clutch operative to couple the driving sleeve and casing, valve connections for actuating the control means and connected to be operable with the accelerator.

11. In combination with a motor and manually operable accelerator connections thereto, a transmission mechanism comprising a drive member, a driving shaft, a driving sleeve, driving gears carried by the driving shaft and the driving sleeve, planet gearing engaged by the drive gears and journalled in a rotatable casing, a driven shaft having a driven gear meshing with the planet gearing to be driven thereby, gear pump control means connected for retarding the casing for planet gearing drive, an overrunning clutch connection between the driving member and the driving shaft and adapted to permit advance rotation of the latter, a centrifugally acting clutch operative to couple the driving member and the driving sleeve and a second centrifugally acting clutch operative to couple the driving sleeve and the casing for direct drive, said gear pump control means being provided with a yielding relief valve operative, under excess pressure, to permit fluid discharge to cushion the holding action on the casing and resulting in progressive change of drive.

12. A transmission as defined in claim 11 and having actuating connections for the gear pump control means connected for operation with the accelerator connections, substantially as described.

13. A transmission of the character described comprising a drive member, a driving shaft, a driving sleeve surrounding the driving shaft, driving gears carried by the driving shaft and the driving sleeve, planet gearing engaged by the drive gears and journalled in a rotatable casing, a driven shaft having a driven gear meshing with the planet gearing to be driven thereby, control means for retarding the casing for planet gearing drive, an overrunning clutch connection between the driving member and the driving shaft and adapted to permit advance rotation of the latter relative to the member, an automatically acting clutch operative to couple the driving member and the driving sleeve and a second automatically acting clutch operative to couple the driving sleeve and the casing to rotate in unison for direct drive, said second clutch consisting of a hub-key drive member fixed on the sleeve having key engagement with oppositely positioned, radially movable clutch segments, oppositely threaded spindles engaging the segments, bell-crank governor levers carried by the spindles, a slidable collar engaged by the lever inner arms, a compression spring arranged to press on the collar and said segments being arranged for coupling engagement with a co-acting flange on the casing.

14. A transmission as claimed in claim 13 having manual adjusting means for the tension of the compression spring consisting of a co-acting bearing collar slidably mounted on the sleeve to engage the spring, a pivoted shifting lever engaging the collar, manually operable connections for shifting the lever provided with detent retaining means for the connection and a stop flange means interposed between the spring bearing collars operative by engagement to prevent expanding movement of the governor levers.

15. A transmission of the character described comprising a drive member, a driving shaft, a driving sleeve surrounding the driving shaft, sun driving gears carried by the driving shaft and the driving sleeve, planet gearing engaged by the driving gears and journalled in a rotatable casing, a driven shaft having a driven gear meshing with the planet gearing to be driven thereby, control means for retarding the casing to effect planet gearing drive, an automatically acting clutch operative to couple the driving member and the driving sleeve for intermediate drive, a second automatically acting clutch operative to couple the driving sleeve and the casing to rotate in unison for direct drive and means for holding the sleeve against rotation for reverse drive.

16. A transmission of the character described comprising a drive member, a driving shaft, a driving sleeve surrounding the driving shaft, sun drive gears carried by the driving shaft and the driving sleeve, planet gearing engaged by the drive gears and journalled in a rotatable casing, a driven shaft having a driven gear meshing with the planet gearing to be driven thereby, control means for retarding the casing for planet gearing drive, an overrunning clutch arranged to permit advance rotation of the drive shaft gear relative to the drive member, an automatically acting clutch operative to couple the driving member and the driving sleeve, a second automatically acting clutch operative to couple the driving sleeve and the casing for direct drive, manually operated connections operative to adjust the action of the second clutch and manually controlled means for holding the sleeve against rotation for reverse drive.

17. A transmission of the character described comprising a drive member, a driving shaft, a driving sleeve surrounding the driving shaft, driving gears carried by the driving shaft and the driving sleeve, planet gearing engaged by the driving gears and journalled in a rotatable casing, a driven shaft having a driven gear meshing with the planet gearing to be driven thereby, control means for retarding the casing for planet gearing drive, an overrunning clutch connection between the driving member and the driving shaft and adapted to permit advance rotation of the shaft relative to the member, automatically operating means to couple the driving member and the driving sleeve and a second automatically operating means operative to couple the driving sleeve and the casing to rotate in unison for direct drive.

KARL JOSEF STRIGL.